US007972081B2

(12) United States Patent
Linares (10) Patent No.: US 7,972,081 B2
(45) Date of Patent: Jul. 5, 2011

(54) SEA WALL SYSTEM WITH DISPLACEABLE AND WATER LEVEL ACTUATING COMPONENTS

(75) Inventor: Miguel A. Linares, Bloomfield Hills, MI (US)

(73) Assignee: Oria Collapsibles, LLC, Auburn Hills, MI (US)

(*) Notice: Subject to any disclaimer, the term of this patent is extended or adjusted under 35 U.S.C. 154(b) by 321 days.

(21) Appl. No.: 12/315,692

(22) Filed: Dec. 5, 2008

(65) Prior Publication Data

US 2009/0148237 A1 Jun. 11, 2009

Related U.S. Application Data

(60) Provisional application No. 60/992,557, filed on Dec. 5, 2007.

(51) Int. Cl.
*E02B 28/00* (2006.01)
*E02B 36/00* (2006.01)
*E02B 3/10* (2006.01)

(52) U.S. Cl. .......... 405/105; 405/106; 405/107; 256/13; 256/73

(58) Field of Classification Search ............ 405/80, 405/98, 103, 104, 105, 106, 107, 115; 256/13, 256/73; 52/169.14
See application file for complete search history.

(56) References Cited

U.S. PATENT DOCUMENTS

| | | | | |
|---|---|---|---|---|
| 4,073,147 A * | 2/1978 | Nomura | ............................ | 405/94 |
| 4,842,442 A | 6/1989 | Caulfield | | |
| 5,725,326 A * | 3/1998 | Van den Noort | .............. | 405/104 |
| 6,029,405 A * | 2/2000 | Wood | ............................... | 52/2.23 |
| 6,216,399 B1 * | 4/2001 | Belarbi | ...................... | 52/169.14 |
| 6,338,594 B1 * | 1/2002 | Adler et al. | ..................... | 405/97 |
| 6,390,730 B1 | 5/2002 | Scheibe | | |
| 6,454,491 B1 | 9/2002 | Wayne | | |
| 6,514,011 B2 * | 2/2003 | Nomura et al. | ............... | 405/107 |
| 6,623,210 B2 * | 9/2003 | Nomura et al. | ............... | 405/107 |
| 6,732,479 B2 * | 5/2004 | Nomura et al. | .................... | 52/64 |
| 7,033,112 B2 | 4/2006 | Rijlaarsdam | | |
| 2008/0247825 A1 * | 10/2008 | Bonds | ........................... | 405/107 |

FOREIGN PATENT DOCUMENTS

| | | |
|---|---|---|
| DE | 3916558 A1 | 7/1990 |
| DE | 19522614 A1 | 1/1997 |

\* cited by examiner

*Primary Examiner* — Tara Mayo-Pinnock
(74) *Attorney, Agent, or Firm* — Gifford, Krass, Sprinkle, Anderson & Citkowski, P.C.

(57) ABSTRACT

A sea wall system incorporated into a continuous and foundation supported structure, including a plurality of panels which are displaced in either of vertical or horizontal fashion from interior locations associated with the foundation structure. The panels are each constructed of a lightweight and fluid resistant material and are each displaceable from a first retracted position to an extended position, whereby the components collectively establish a heightened water barrier. A fluid communicating opening is defined in the foundation support and, in response to a rising water level, vertically displaces the panels.

7 Claims, 6 Drawing Sheets

SEA WALL SYSTEM WITH DISPLACEABLE AND WATER LEVEL ACTUATING COMPONENTS

CROSS-REFERENCE TO RELATED APPLICATIONS

The present application claims the priority of U.S. Provisional Patent Application Ser. No. 60/992,557, filed Dec. 5, 2007, and entitled SEA WALL SYSTEM SYSTEM WITH DISPLACEABLE AND WATER LEVEL ACTUATING COMPONENTS.

FIELD OF THE INVENTION

The present invention discloses a sea wall system incorporated into a continuous and foundation supported structure, such as a concrete wall, or a plurality of spaced apart and likewise supporting columns. More specifically, the system incorporates a plurality of individually displaceable components, such as constructed of a lightweight and fluid resistant polymer or other suitable material.

In a first variety of preferred applications, a plurality of panels are vertically or horizontally displaceable from interior locations associated with the concrete wall, such as in response to a rising water level, as well as to seal off an ingress/egress (street) opening between spaced apart supports. The structures can also be designed such that the rising fluid levels vertically displace the individually displaceable components.

Additional variants include the positioning of the support structures in spaced apart and column extending fashion. Interiorly stored components displace in sideways fashion and are sealingly engaged with additional and vertically extending mounting locations associated with each of the support structures. Additional features such as floor/base mounted and fluid tight tracks engage bottom edges of the sideways extending components, and in addition to spaced apart and selectively displaceable side pillar supports for ensuring structural integrity.

BACKGROUND OF THE INVENTION

The present invention is documented with various types of flood retardant barriers, among these including those which can be incorporated in use with an existing base structure. The objective of such designs is that they can be utilized in response to a flood condition and which would otherwise overtop the existing flood retardant structure.

A first example of a known portable seawall system is set forth in U.S. Pat. No. 6,454,491, issued to Wayne, and which is designed to upwardly extend an existing seawall. A base bracket is designed to attach to the upper edge of the seawall. A wall section is provided to extend upwardly from the existing sea wall. A plurality of triangular brace assemblies each include a portion extending above the base bracket and engaging the wall section, and another portion extending below the base bracket and engaging the existing sea wall. A membrane seals the wall section to the existing sea wall. Multiple wall sections can also be jointed end to end to form a continuous sea wall.

Additional references of note include the transportable and foldable protective barrier of Trisl U.S. Pat. No. 6,079,904, and which discloses a series of supports articulately joined with one another by a number of parallel extending pipe rods, along with number of reinforcement filling elements, such as for bridging the gaps between the pipe rods. The supports are unfolded into bracing triangles and joined with the pipe rods which span a plan which are completed by grids or panels as reinforcement filling elements. The panels are laid over the supports and reinforcement filling elements, such as in response to high water.

Caulfield, U.S. Pat. No. 4,842,442, teaches a seawall extension apparatus for use with a capped seawall. The apparatus includes a wall section and a support assembly for holding the wall section such that it extends generally upwardly from the cap of the seawall and is releasably secured thereto.

SUMMARY OF THE INVENTION

A sea wall system incorporated into a continuous and foundation supported structure, including a plurality of panels supported in displaceable fashion from interior locations associated with the foundation structure. The panels are each constructed of a lightweight and fluid resistant material and are each displaceable from a first retracted position to an extended position, whereby the components collectively establish a heightened water barrier. A fluid communicating opening is defined in the foundation support and, in response to a rising water level, vertically displaces the panels.

Additional features include an open space established between first and second portions of the wall defining a street opening. The interiorly stored panels are typically displaceable in sideways extending fashion, and are sealingly engaged with additional and vertically extending mounting locations associated with each of first and second spaced apart support structures.

Floor mounted and fluid-tight tracks are provided for engaging bottom edges of the sideways extending components, and in addition to spaced apart and selectively displaceable side pillar supports for ensuring structural integrity. At least one spring-loaded support is associated with each of the vertically displaceable panels for retaining each in an uppermost elevated position. A hingedly secured panel is also secured to an opening defining extending edge location of the support structure.

In other applications, the components each further exhibit an accordion-shaped and linearly displaceable panel secured to an extending edge location of a concrete wall associated with the support structure. Also, at least one displaceable component can be provided as a coiled and flexible roll secured to an extending edge location of a concrete wall associated with the support structure. Another variant incorporates a pair of elongated chains extensible across the open space established between the first and second portions of the wall defining a street opening, a plurality of rigid and interlocking panels establishing a fluid-tight and track mounted support between the wall portions.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
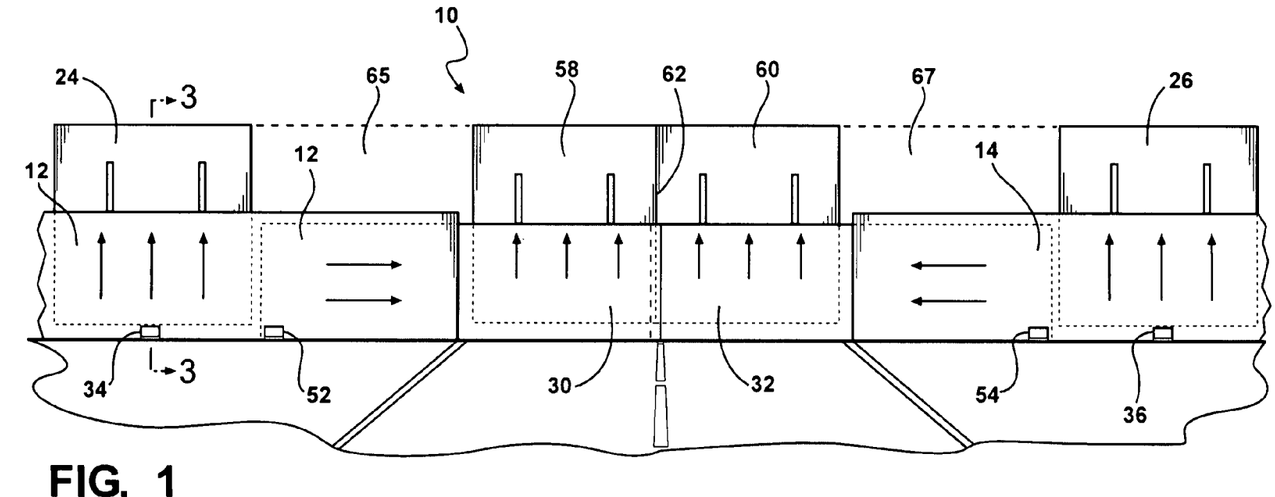
FIG. 1 is a front view of a sea wall system according to a first preferred embodiment of the present invention and incorporating a plurality of vertically displaceable and fluid resistant panels mounted to passageway defining and spaced apart concrete foundation supports according to the present invention.

Referring now to FIG. 1, a front view is illustrated at 10 of a sea wall system according to a first preferred embodiment of the present invention. As previously described, the present invention disclose a sea wall system incorporated into a continuous and foundation supported structure, such as a concrete wall, or a plurality of spaced apart and likewise supporting columns and within which are selectively stored and outwardly displaced a plurality of individual components, such as constructed of a lightweight and fluid resistant polymer or other suitable material, and in order to effectively raise a water retaining level of the foundation supported structure, this including such as a breakwater or flood plain located assembly, and where variances of water level can exceed several feet or more, thus rendering a standard retaining wall or breakwater insufficient.

Figure 2:
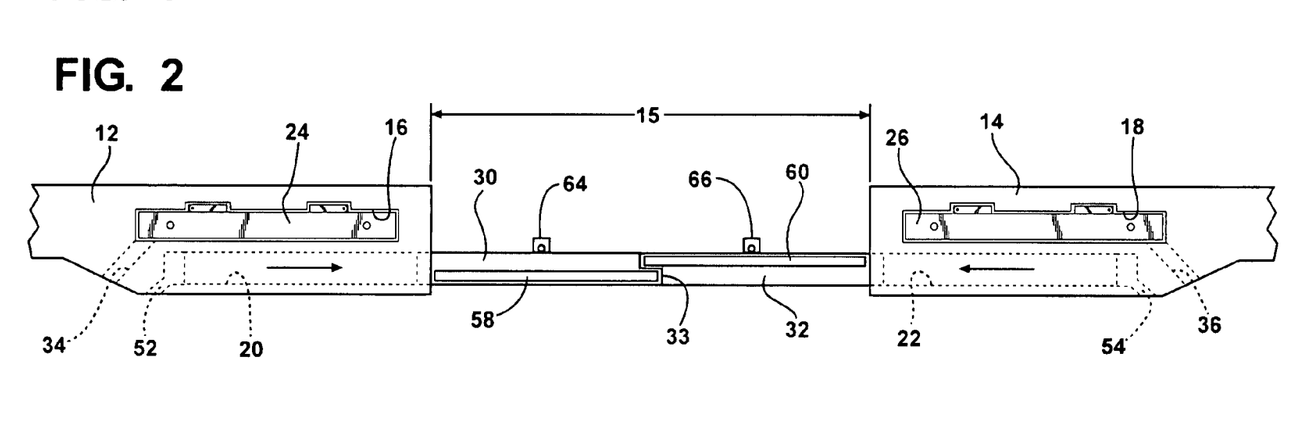
FIG. 2 is a top view of the sea wall system according to FIG. 1 and better illustrating the horizontally displaceable street closing components, in turn incorporating additional vertically displaceable panels for achieving a consistent elevated restraining structure.
Figures 3, 4, 5:
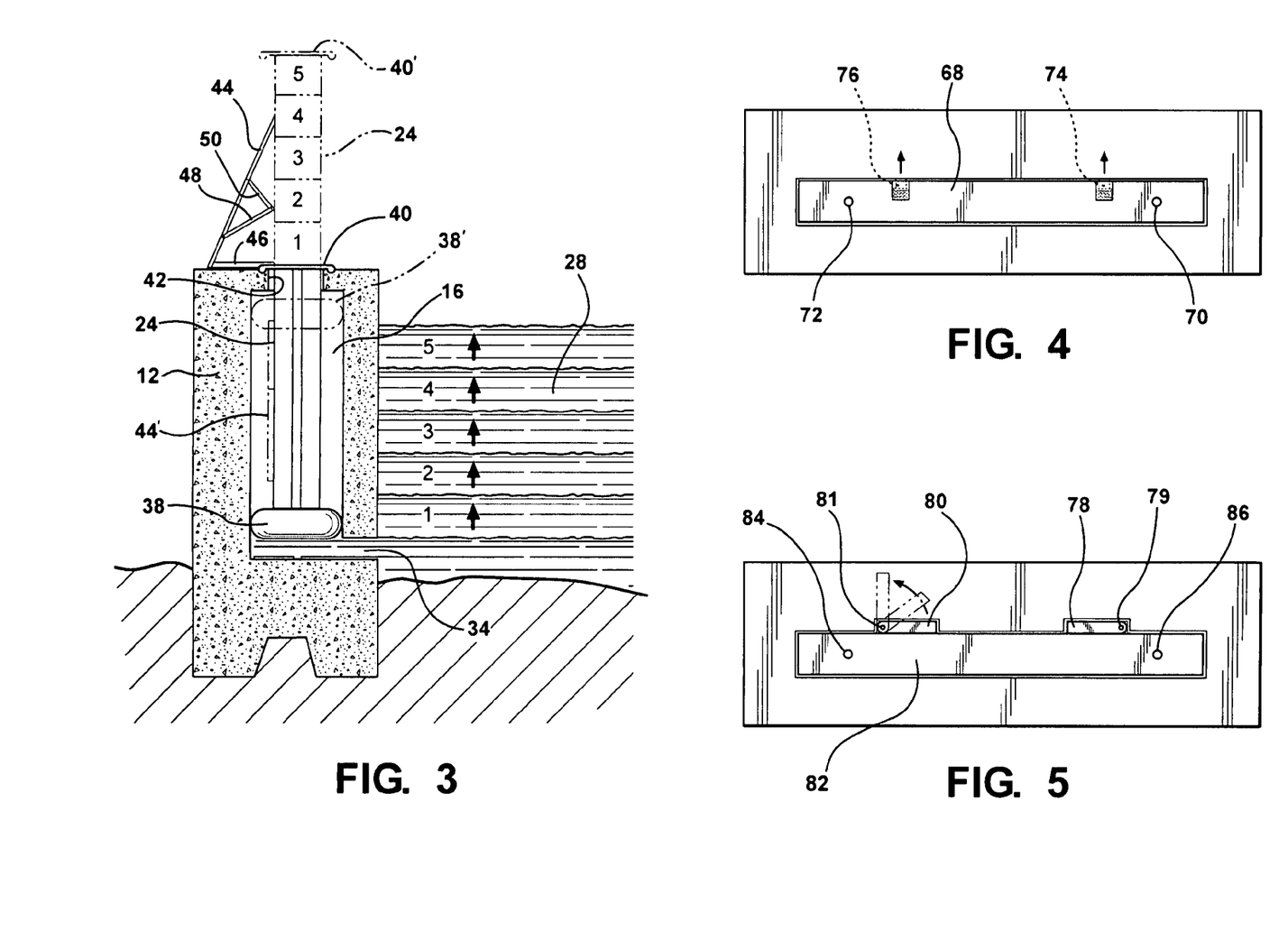
FIG. 3 is a cutaway view taken along line 3-3 of FIG. 1 and illustrating water level actuation of each of the inner supported and vertically displaceable components associated with the foundation structure.
FIG. 4 is a top view of the illustration of an alternately configured vertically displaceable component associated with a selected foundation emplacement, such as shown in FIGS. 1 and 2, and further illustrating vertically extending guides and spring-loaded supports for securing the vertical component in a locked and use position.
FIG. 5 is an alternate variant to that shown in FIG. 4 of a pair of rotatably disposed and spring-loaded supports for securing the vertical component in its raised position.

The foundation structure associated with the first embodiment of FIGS. 1-3 collectively includes a first three dimensional concrete emplacement 12 and a second likewise configured emplacement 14. As described previously, the concrete foundation can establish a continuous wall or, in the embodiment illustrated, can include first 12 and second 14 such foundation emplacements which are separated by a suitable opening distance 15 (see FIG. 2) for accommodating crosswise traversing traffic. It is further understood that the sea wall system can be utilized with any suitable water resistant foundation, such as which can operate in an initial flood barrier condition, with progressively increasing water levels initiating the sea wall system extension relative to the concrete foundation for responding to such increased water levels and in order to extend/heighten the barrier capability of the emplacement.

An application of the present invention is the ability to locate such an elongated breakwater or flood control structure at a given location and which may include, during normal or low tide conditions, a normally extending roadway or intersection, such as for supporting vehicular traffic. An advantage of the present inventions is the ability to selectively close and seal the opening 15, concomitant with elevating the effective fluid restraining level of the assembly in order to effectively restrain a rising tide or flooding water level.

Viewing FIGS. 1-3 collectively, each of the structurally supporting (e.g. concrete or other suitable construction) emplacements 12 and 14 exhibit a desired elongated and three-dimensional wall like appearance. One or more recessed volumes, see as primarily shown at 16 & 18, and again at 20 & 22, are communicable through top surface accessible locations associated with each of the concrete emplacements 12 and 14.

A first plurality of panels are illustrated at 24 & 26, these being respectively seated within the surface accessible recessed volumes 16 and 18 and such that the panels 24 and 26 are capable of being vertically displaced (see as further shown in FIG. 2) from interior locations associated with the concrete wall emplacements 12 and 14, this such as in response to a rising water level, see fluid level 28 in FIG. 3.

The panels 24 and 26, as well as additional horizontally displacing panels 30 and 32 associated with corresponding (opposing) side edged accessible and interior volume recesses 20 and 22 for selectively closing opening 15, are each typically constructed of a polymer or other suitable material, whether natural or artificial, and which exhibits the necessary properties of sufficiently light or moderate weight, as well as fluid impermeability (resistance) to rising fluid levels (again at 28) and which can be exerted against a selected facing side of the panels when displaced from within the concrete emplacements, see again as shown in FIG. 3. Along these lines, the abutting edges established between each succeeding pair of panels may include a membrane or other fluid sealing composition to assist in maintaining the fluid integrity of the erected fluid barrier.

As best shown in FIG. 3, which is a cutaway view taken along line 3-3 of FIG. 1, illustrated is a water level actuation of selected and inner supported/vertically displaceable panel component 24 associated with the foundation structure 12. An illustrated feature of the present invention is the ability to elevate each of the vertically displaceable panels (such as again shown at 24 and 26 in FIGS. 1 and 2) automatically and in response to the rising water level 28. Influencing the buoyant panels 24 and 26 in the desired fashion is accomplished in one illustrated variant through the formation of fluid inlet apertures, see as shown at 34 and 36 in FIG. 1.

Referring again to FIG. 3, the indicated opening 34 permits water pressure to communicate with the open interior volume 16 of the associated concrete foundation and to upwardly actuate a floating device 38 constituting a lowermost and fluid sealing component arranged in sealing contact with the perimeter interior of the opening 34. The device 38 may include such as a buoyant, e.g. polymeric or rubberized, component which prevents substantial fluid leakage between its outer edges and the corresponding abutting surfaces of the inner side wall edges of the receptacle volume 16, while permitting the buoyant device 38 to vertically/upwardly displace the panel 24 which is supported thereon.

Progressive elevation of the fluid water level, see as indicated by incrementing reference to foot marker levels 1-5 in FIG. 3, in turn causes the floating device 38 to likewise elevate, up to an uppermost seating position 38' (see as illustrated in phantom) in which the upwardly most displaced floating device abuts against an inner top surface of the interior volume 16. At this point, the vertically elevate-able panel 24 is automatically displaced upwardly to a point at which an upper most positioned cap portion (such as constructed of fluid sealing gasket material or the like) displaces between a first position 40 in which it provides sealing engagement around a top surface aperture location (at 42 in FIG. 3), and such as to prevent rain or other inadvertent fluid from filling a sub-volume of the inner recess volume 16 located above the floating device 38 (whether or not a bottom filling flood condition is in existence), to a second upper most displaced position 40' in which it defines a highest elevated level of the water retaining panel 24.

A spring loaded support 44 is provided and includes interiorly supporting flex hinge members 46, 48 and 50. The nature of the generally triangular support is such that it is collapsed in a generally abutting fashion, see as illustrated at phantom at 44' in FIG. 3, when retained within the interior receptacle volume 16 of the concrete foundation, and during the panel 24 being substantially recessed within the foundation emplacement.

Upon the fluid level achieving a substantially uppermost position, see further as referenced by fluid level 5 in FIG. 3, the lower most position flex hinge member 46 (in combination with the additional interior hinge members 48 and 50), outwardly displaces such that the support prevents the associated panel 24 from being retracted, and until such time as an operator physically collapses the support 44 and allows the panel to retract within the foundation emplacement. This feature is of particular value in instances in which a storm or flooding surge can vary (such as in a pulse or tide-like fashion) and by which it is desired that the elevatable panel 24, once actuated, remain in its most fully extended position until reset in its original withdrawn position.

Referring again to FIGS. 1 and 2, and in particular to the horizontally and inwardly displaceable panels 30 and 32 seated within side accessible apertures (see FIG. 2), additional apertures, see at 52 and 54 respectively, can also be associated with inner side edges of the foundation emplacements for communicating with the apertures 20 and 22 and, concurrent with the upwardly actuation inducing apertures 34 and 36, can likewise serve to provide additional and inwardly contacting bias against the panels 30 and 32, in order to maintain the same in the street closing position of FIG. 2 (this further assisting in maintaining a fluid sealing edge created between any pair of displaceable panels, and as further illustrated at 33 in FIG. 2). Given the importance of pre-closing the panels 30 and 32 (and thereby preventing any fluid from entering between the concrete emplacements 12 and 14) the apertures 52 and 54 are understood to be of secondary significance and to only act as an additional biasing feature for maintaining the seal-tight integrity of the panels 30 and 32 at an inter-abutting central, e.g. jigsaw, location 56 (again FIG. 2).

As shown in FIGS. 1 and 2, additional and vertically elevatable components 58 and 60 are provided, these being recessed within the initially horizontally displaceable panels 30 and 32 and, when upwardly actuated, establish a consistent fluid tight wall (see again membrane or sealant edge 33 in FIG. 2) in view of the previously described panels such as at 24 and 26. Although not shown, it is further understood that edge-to-edge sealing means, see for example as shown at 62 in FIG. 1, is provided between each vertically elevatable sub-panel 58 & 60 (as well as between each of the other elevatable concrete emplaced panels 24, 26, et. seq.) can be provided, such including gaskets or other fluid-tight members, and which are intended to prevent any significant fluid seepage from between each elevate-able panel, and which would otherwise compromise the effectiveness of the height increasing water retention capabilities of the assembly.

Also shown in FIG. 1 are the provision of side reinforcing portions 64 and 66, these being associated with the panels 30 and 32 and functioning either to assist in manually (or powered electrical) closing of the panels and buttressing the same against the building fluid forces of the water volume being retained. Also illustrated in phantom are a pair of additional insert panels, see at 65 and 67, these being installed in place upon the concrete foundation structures 12 and 14, and so that the panels 65 and 67 are installed in fluid sealing fashion between the vertically displaceable panels 24 & 58 and 26 & 60, respectively.

It is understood that the panels 65 and 67 are provided as optional and additional/auxiliary fluid sealing components in specified applications in order to establish a continuous elevated barrier at the locations of the concrete foundations not conducive to incorporation of vertically displaceable panels. That said, it is further envisioned and understood that the concrete foundations 12 and 14 can be reconfigured such that the panels 65 and 67 can be incorporated in dedicated interior recessed volumes (not shown), at varying locations along the concrete foundation. FIG. 2 further illustrates the positioning of the vertically displaceable panels 24 and 26 closer to the middle opening 15 of the concrete foundations 12 and 14, relative to their position shown in FIG. 1, with the further understanding that the vertical or horizontal displaceable recessed panels can be repositioned to any location which facilitates establishing a continuous and elevated fluid sealing barrier in use with an existing fluid barrier sub-structure.

Referencing now FIG. 4, a top view is shown of a selected vertically displaceable panel component 68, as an alternative to the vertically displaceable components 24 and 26 associated with the concrete emplacements 12 and 14 such as shown in FIGS. 1 and 2, and further illustrating such as vertically extending guides 70 and 72 and associated (bottom edge disposed) spring-loaded supports 74 and 76, for raising and securing the vertical component(s) in a locked and use position. The guides 70 and 72 extend vertically (or optionally horizontally in regards to likewise horizontally displaceable panels such as shown at 30 and 32 in FIG. 1) within the open interior and panel supporting volumes of the foundation structure, and are further anchored at a recessed location in order to provide fixed guides upon which the associated panel 68 is secured.

FIG. 5 illustrates an alternate variant to that shown in FIG. 4, and by which a pair of rotatably disposed and spring-loaded supports, at 78 and 80 with associated hinge locations 79 and 81, are secured to a likewise lower edge of a selected panel 82 and, upon clearing a top surface of the foundation emplacement 12, the spring loaded supports 78 and 80 are caused to rotate outwardly about their hinge locations 79 and 81 and lock into place, this corresponding to the panel 82 being raised to its substantially upper-most position. As with the panel 68 in FIG. 4, a pair of vertically extending guide supports, see at 84 and 86, assist in even elevation and lowering of the panel.

Figure 6:
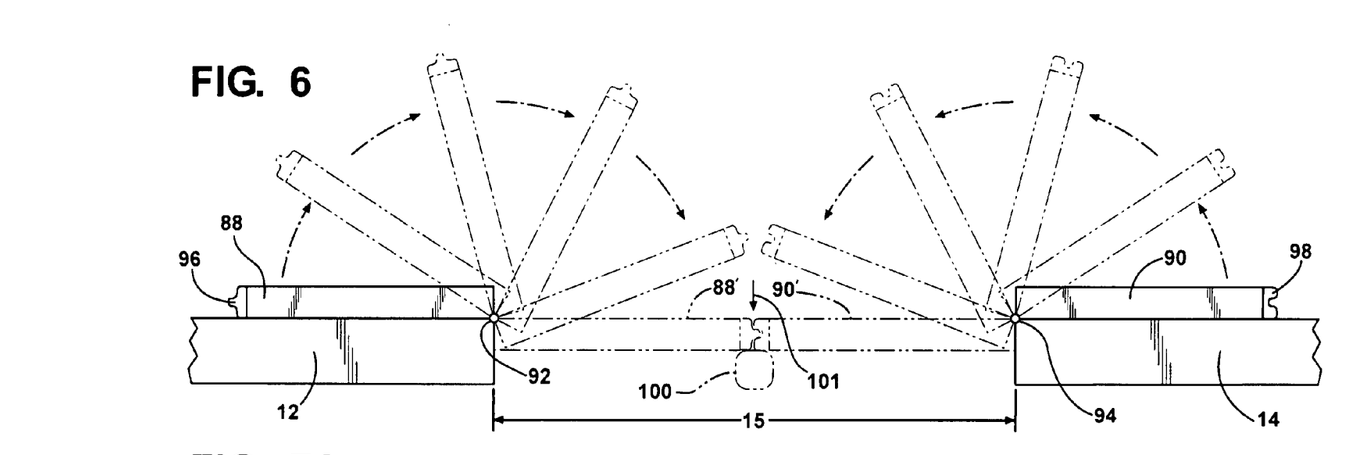
FIG. 6 is an illustration of an alternate configuration of a street closing component and which is hingedly supported along edge locations of associated and spaced apart foundation supports.

Referring now to FIG. 6, an illustration is shown of an alternate configuration of a street closing component (or panel) and which is illustrated by panels 88 and 90 respectively associated with the spaced apart concrete foundation walls 12 and 14, and which are hingedly supported along edge locations, see at 92 and 94, of associated and spaced apart foundation supports. In order to establish an improved seal between the opposing and end engaging locations of the panels 88 and 90, end mounted and inter-engaging gaskets 96 and 98 are provided in vertically extending fashion along opposing and abutting extending edges of the panels 88 and 90, this in order to prevent fluid leakage upon the closing the same as represented in the succession of phantom positions established by the panels 88 and 90 and between the initial retracted position and a rotated/closed opposing position (see at 88' and 90'). As further representatively shown in phantom at 100, a reinforcing support or the like can be either fixedly/permanently or temporarily/insertably positioned in supporting fashion along an inside abutting surface of either or both of the panels illustrated at 88' and 90', and which serves to prevent buckling inward in response to mounting fluid forces exerted such as along directional arrows 101.

Figure 7A:
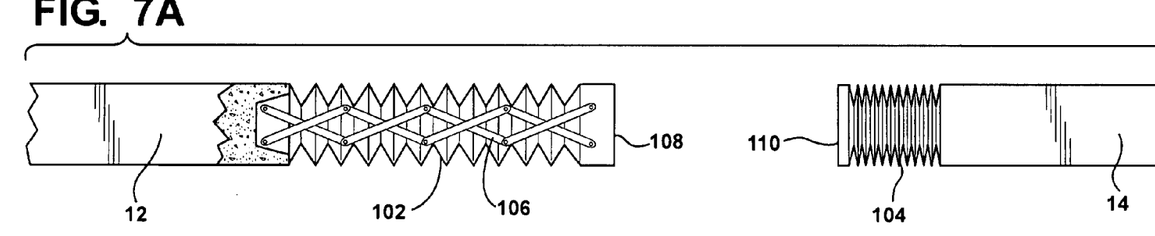
FIGS. 7A-7C present sectional as associated inset illustrations of a further alternate configuration and illustrating either a single or pair of sideways displaceable accordion-like elements associated with end-supported portions of a pair of likewise spaced apart and street opening defining foundations, the displaceable elements each incorporating interior and structure defining rib supports, and further capable of being manually or electrically actuated between closing (engaging) and retracted (stored) positions.

FIG. 7 is a sectional illustration of a further alternate configuration of street closing support and illustrating the use of a single or, as illustrated, a pair of sideways displaceable accordion-like elements 102 and 104 associated with end-supported portions of a pair of likewise spaced apart and street opening defining foundations 12 and 14. In particular, the displaceable elements 102 and 104 each incorporate convertible and interior/structural defining rib supports, see as shown by scissor/actuating components 106, and which are further capable of being manually or electrically actuated between closing (engaging) and retracted (stored) positions. Engaging edges 108 and 110 of the accordion like displaceable elements 102 and 104 are capable of sealingly engaging in the extended/closed positions.

Figure 7B:
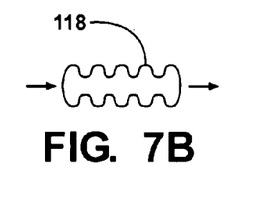
Figure 7C:
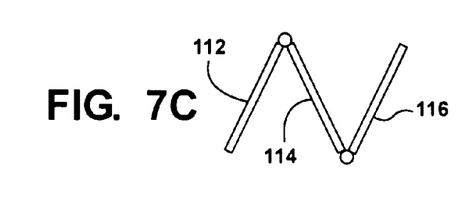

Viewing further the rotated inset of FIG. 7C, each of the accordion-like elements can include individual panels 112, 114, 116, ET. seq., these being hingedly connected along adjoining edges. It is further envisioned that the accordion like element can also illustrate a further profile or configuration, as shown at 118 (see FIG. 7B) and by which each of the panel assemblies adopts a more three-dimensional and elongate extensible configuration.

Figure 8:
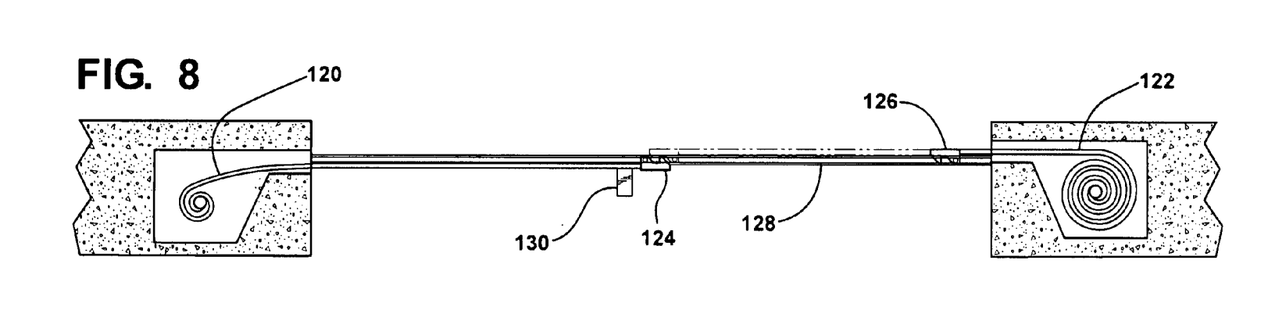
FIG. 8 is a further illustration of another possible configuration and by which the displaceable components are provided as a coiled and flexible roll supported in a first stored condition within an interior location of the foundation structure and displaceable in a second condition to close off a street opening defined between the spaced apart foundations.

Referring to FIG. 8, an illustration is shown of another possible configuration of an ingress/egress closing assembly established between a pair of spaced apart water retaining foundation structures, and by which either a single or a pair of displaceable components are provided as coiled and flexible rolls 120 and 122. The concrete foundations are further modified in this variant, and such as being alternately casted to exhibit inwardly facing recess volumes, within which are supported the water proof rolls 120 and 122 in a first stored condition within an interior location of the foundation structure. Although not clearly shown, it is further understood that an appropriate coil-like biasing spring can be employed to assist in retracting the rolls 120 and 122 when not in use.

The rolls 120 and 122 are displaceable in a second/street closing condition to close off a street opening defined between the spaced apart foundations and such as by opposing edges 124 and 126 of the rolls being lockingly engaged together. Another feature associated with one or more of the various sub-embodiments being disclosed herein is the provision of a ground recessed and widthwise opening extending track, see as shown at 128, and which seatingly engages a bottom traversing edge (not shown) of each roll 120 and 122 in a fluid watertight sealing and fixed structural fashion.

Additional features, such as inwardly facing intermediate reinforcing supports 130 can be provided and which are either separately attached to an extended location associated with a selected roll (120) or which can be hingedly secured in substantially flush fashion against the associated roll in a first retracted position, and subsequently rotated to a perpendicularly extending and ground engaging fashion in a second position. As with the previously disclosed variants, the rolls 120 and 122 can be either mechanically or power actuated between retracted/opened and extended/closed positions and it is further understood that the physical construction of the rolls are such that they can exhibit a required degree of flexural modulus (or bend) in order that they can be wound in the fashion shown, yet while still retaining the necessary fluid sealing and structural supporting properties.

Figure 9:
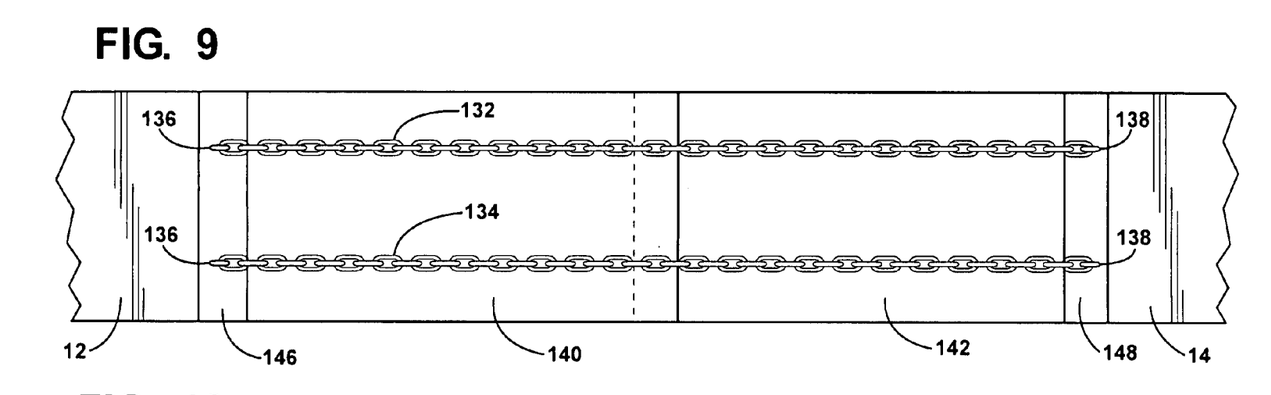
FIG. 9 is an illustration of a quick connect structure for sealing a street opening, such as in a flood plain, and incorporating a pair of lengthwise extendable support chains.
Figure 10:
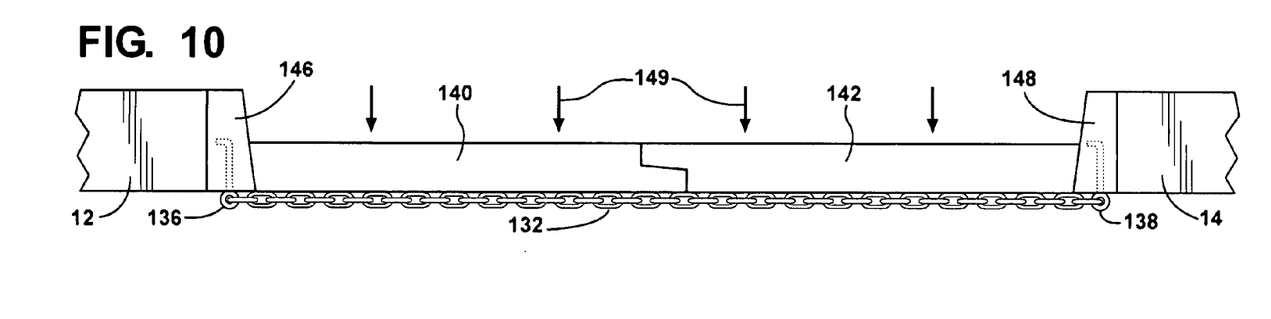
FIG. 10 is a top view of the configuration of FIG. 9, and further illustrating a plurality of interlocking and fluid tight support panels held in place by the force of the fluid acting upon the exposed face of each panel and in supporting manner against the chains.

Referring now to FIGS. 9 and 10, front and top illustrations are shown, respectively, of an alternate version of quick connect structure for sealing a street opening, such as again in a flood plain, and incorporating a pair of lengthwise extendable support chains 132 and 134. The configuration of FIGS. 9 and 10 is envisioned to provide a quick fix solution for closing a street opening established between the extending and spaced apart breakwater or flood control structures 12 and 14, and by which the chains 132 and 134 are initially anchored at opposite paired end locations 136 and 138, these associated with the foundation structures.

One or more pairs of elongated and jigsaw-interlocking composite panels 140 and 142 are provided and are assembled in abutting fashion against the chains 132 and 134, and such that the plurality of interlocking and fluid tight support panels are held in place by the force of the fluid acting upon the exposed face of each panel, and in supporting manner against the chains. The chains can further include a turnbuckle or the like (not shown) for selectively adjusting an associated tension and to prevent the buckling of the panels.

The panels can further be provided in any plurality necessary to cover a desired opening space between the structures 12 and 14, and it is also envisioned that the panels can be optionally hinged together along opposite edges for converting between folded/retracted and unfolded/extending positions. Additional sealing membranes can be established between opposing/abutting edges of the panels and in order to retain its fluid-tight capabilities. As also shown in FIG. 9, opposing (inwardly) edges of the concrete emplacements can exhibit polymeric or composite constructed faces 146 and 148, such as to assist in holding the anchor locations 136 and 138 in place (such as when placed under extreme tension situations exerted by pressing water forces and identified by arrows 149 in FIG. 10).

Figure 11:
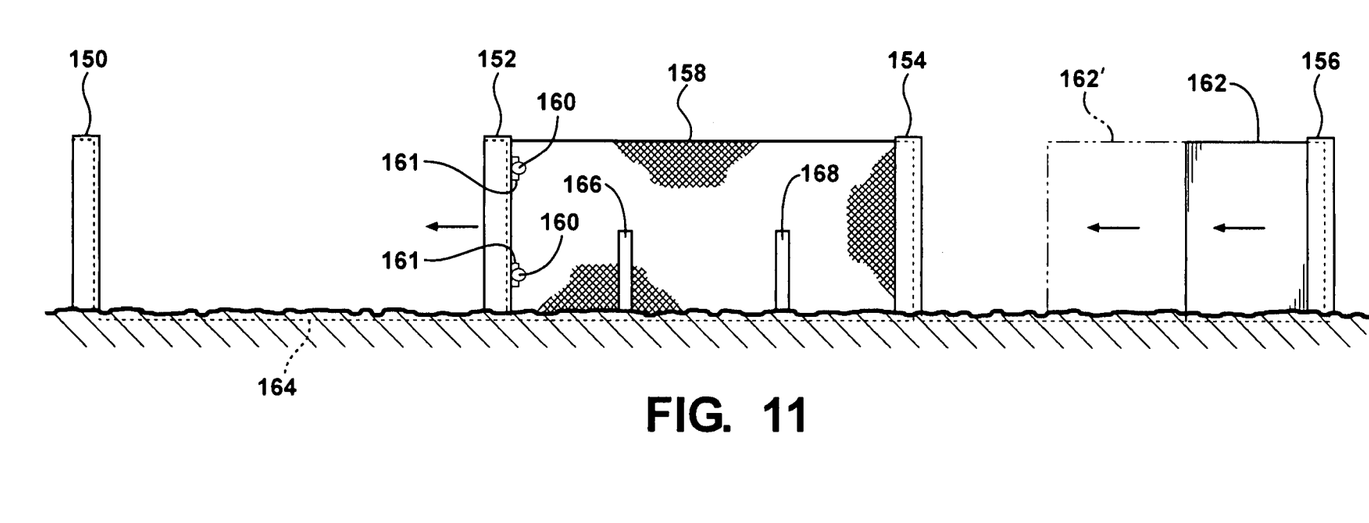
FIG. 11 is a side illustration of a plurality of support structures in spaced apart and column extending fashion, interiorly stored components displacing in sideways fashion and being sealingly engaged with additional and vertically extending mounting locations associated with each of the support structures.

FIG. 11 is a side illustration of a plurality of support structures 150, 152, 154, 156, each of which are arranged in spaced apart and column extending fashion according to a further preferred embodiment. Each of the column structures defines such as a pillar of an associated sea wall and incorporates an interiorly stored and selected extensible fluid retaining component, see as shown by example at 158, and which displaces in sideways extending fashion from selected column 154. An extending edge of the flexible and extensible component 158 is represented by engaging locations 160 and which are sealingly engaged with additional and vertically extending mounting locations, see at 161, associated with a reverse face of the selected and succeeding support structure 152.

Figure 12:
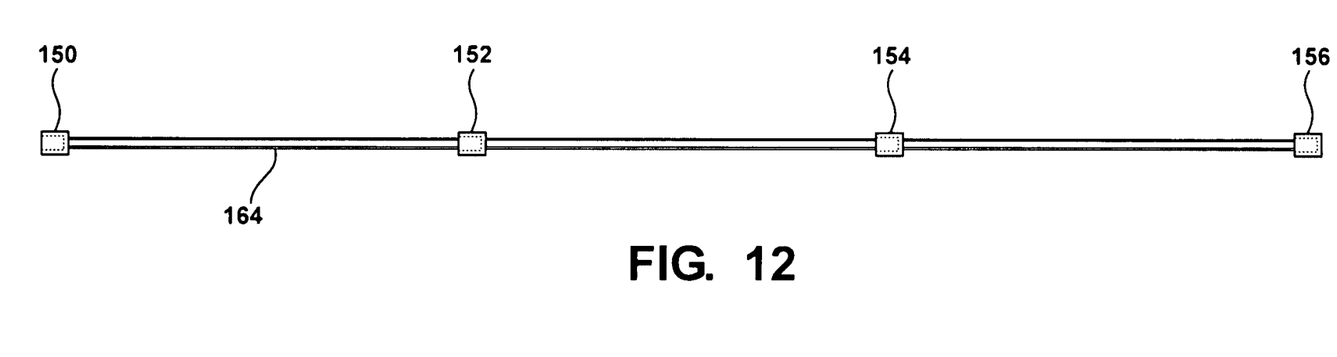
FIG. 12 is a top view of the configuration shown in FIG. 11 and further showing the ground tracks engaging bottom edges of the sideways extending components, and in addition to spaced apart and selectively displaceable side pillar supports for ensuring structural integrity of the assembly.

As illustrated, the interiorly stored components displace in sideways fashion, see also 162 in reference to further selected column 156, and are sealingly engaged with additional and vertically extending mounting locations associated with each of the consecutively located support structures. The extensible components can again include such as flexible and extensible rib supports, see again flexible component 158, it further being understood that the panels can be also be alternately configured (again at 162, 162', et. seq.) and can also be envisioned to include rigid and end-to-end secured pieces. Additional features such as floor/base mounted and fluid tight tracks, see at 164 also in top view of FIG. 12, are configured to sealingly and structurally inter-engage corresponding bottom edges of each of the extensible components, and in addition to spaced apart and selectively displaceable side pillar supports, further referenced at 166 and 168 in FIG. 11, and which can be additionally incorporated for ensuring structural integrity.

Figure 13:
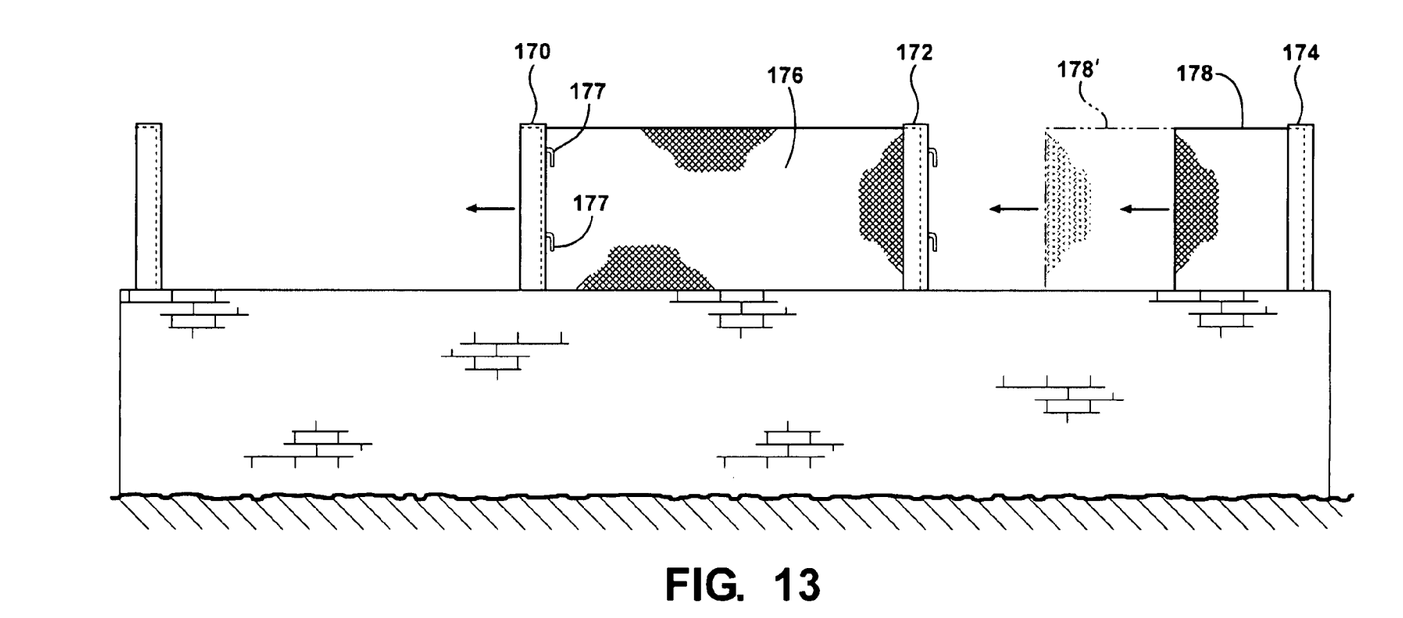
FIG. 13 is a side illustration of a modified assembly and exhibiting the column defined structures of FIG. 11 assembled atop an existing fluid retaining foundation wall.
Figure 14:
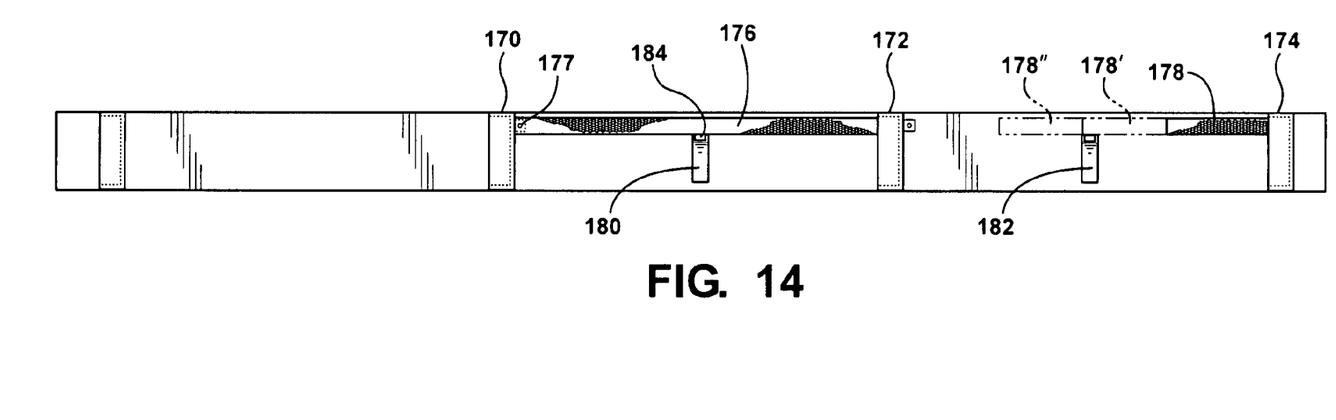
FIG. 14 is a top view of the configuration shown in FIG. 13 and further showing both the laterally displacing nature of the individual components, as well as the side disposed reinforcing supports for preventing buckling in response to increased water levels.

Finally, and referring to each of FIGS. 13 and 14, respective side and top illustrations are shown of a modified assembly exhibiting column defining structures 170, 172, 174, et. seq., similar to that shown in FIG. 11, and assembled atop an existing fluid retaining (concrete or other) foundation wall. As described in the preceding embodiment of FIGS. 11 and 12, a flexible and extensible component can be drawn sideways (in either manual or electric powered fashion) from each of the column-like structures, see as shown at 176, and engaged in secure and fluid-tight fashion (as shown by clip system at 177) to an opposite rear face of adjoining column 170. Although not clearly shown, it is also understood that such as a channel and lip engagement, or other fluid sealing engagement, can be employed between each flexible component and associated engaging column, and again in order to prevent water from seeping through.

As is also referenced in the top view of FIG. 14, an alternate arrangement of rigid and end-to-end secured components 178, 178', 178", etc. seq., can be substituted for the flexible and drawn components 176, and for sealingly bridging a gap between succeeding columns (e.g. at 172 and 174). Although not shown, it is understood that the components 178, 178' and 178" can each include tongue and groove or other male/female biasing and fluid-tight engagement structure for preventing collapse or fluid permeability.

Also again shown are side disposed reinforcing supports, see at 180 and 182, for preventing buckling in response to increased water levels. The reinforcing supports, as previously described, can be hingedly attached to an inner (non-water contacting) surface of each fluid retaining component (see as shown at 184 as to support 180) or, alternatively, can be separately installed to provide a desired degree of lateral strength to the assembly in response to mounting water pressures.

Having described my invention, other and additional preferred embodiments will become apparent to those skilled in the art to which it pertains, and without deviating from the scope of the appended claims:

I claim:

1. A sea wall system incorporated into a continuous and foundation supported structure, comprising:
    a three dimensional concrete emplacement defining an interior volume which is communicable with a lower fluid communication opening and an upper opening;
    at least one vertically displaceable component constructed of a fluid resistant material and supported within the interior of the concrete emplacement;
    a buoyancy inducing component mounted to an underside of said vertically displaceable component in fluid sealing arrangement within the concrete emplacement and, in response to water admittance into the fluid communication opening, vertically displacing said component through the upper opening;
    a spring-loaded support associated with each of said vertically displaceable components including a plurality of flex hinge members extending from said support and which are convertible between a collapsed and abutting position within concrete emplacement and an elevated and expanded position above the emplacement in which a lower most flex hinged member outwardly displaces over a top surface of the concrete emplacement to prevent the component from retracting within the interior until being physically collapsed by an operator; and
    each of said components being displaceable from a first retracted position to an extended position, whereby said components collectively establish an increased fluid retaining level.

2. The system as described in claim 1, said components further comprising a plurality of panels which are displaced in at least one of vertical and horizontal fashion from interior locations of a wall associated with the concrete emplacement, an open space established between first and second portions of the wall defining a street opening.

3. The system as described in claim 1, said vertically displaceable components further comprising interiorly stored components such that, upon being elevated, enable said interiorly stored components to be displaceable in sideways extending fashion so as to be sealingly engaged with additional and vertically extending mounting locations associated with each of first and second spaced apart support structures.

4. The system as described in claim 3, further comprising floor mounted and fluid-tight tracks for engaging bottom edges of the sideways extending components, and in addition to spaced apart and selectively displaceable side pillar supports for ensuring structural integrity.

5. A sea wall system incorporated into a continuous and foundation supported structure, said system comprising:
    a first plurality of spaced apart and individually displaceable panels each constructed of a fluid resistant material, said panels each being supported in a vertical extensible fashion from interior locations associated with the foundation support structure;
    a fluid communicating opening defined in the foundation support and, in response to a rising water level, vertically displacing said first plurality of panels;
    at least one buoyant component arranged in perimeter sealing contact within each of said vertically extending interior locations and, upon experiencing rising water levels, vertically displacing said panel;

at least one spring-loaded support incorporating a plurality of interconnected hinge members which are secured to a side surface of each vertically displaceable panel and, upon upwardly displacing said panel, extending across an upper surface of the foundation supported structure for retaining said panel in an upper-most elevated position;

additional panels displaceable in a horizontal and sideways extending fashion across an open space established between first and second portions of the wall defining a street opening, said additional panels being sealingly engaged within additional interior locations associated with support structures; and each of said panels being displaceable from first retracted positions associated with the interior locations of foundation structure to second extended positions in which said panels establish an elevated and water resistant barrier.

6. The system as described in claim 5, further comprising floor mounted and fluid-tight tracks for engaging bottom edges of said sideways extending panels.

7. The system as described in claim 5, further comprising spaced apart and selectively displaceable pillar supports for ensuring structural integrity of said extended panels.

* * * * *